(12) United States Patent
Funk et al.

(10) Patent No.: US 10,443,471 B2
(45) Date of Patent: Oct. 15, 2019

(54) SELECTIVE CATALYTIC REDUCTION DOSING CONTROL

(71) Applicant: GM Global Technology Operations LLC, Detroit, MI (US)

(72) Inventors: Sarah Funk, Canton, MI (US); Eric M. Sisco, Clinton Township, MI (US); Jose Deleon, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 15/586,801

(22) Filed: May 4, 2017

(65) Prior Publication Data
US 2018/0320572 A1 Nov. 8, 2018

(51) Int. Cl.
*F01N 3/20* (2006.01)
*F01N 11/00* (2006.01)
*F01N 9/00* (2006.01)

(52) U.S. Cl.
CPC .......... *F01N 3/208* (2013.01); *F01N 9/005* (2013.01); *F01N 11/007* (2013.01); *F01N 2610/02* (2013.01); *F01N 2610/146* (2013.01); *F01N 2900/0402* (2013.01); *F01N 2900/08* (2013.01); *F01N 2900/1402* (2013.01); *F01N 2900/1821* (2013.01)

(58) Field of Classification Search
CPC .... F01N 3/208; F01N 2560/026; F01N 11/00; F01N 3/2066; F01N 2900/1622; F01N 2900/0412; F01N 2900/0408; F01N 2900/0411; F01N 2550/00; F01N 2900/0402; F01N 2900/0422; F01N 3/206; F01N 9/005; B01D 53/9495; F02D 2041/1469
See application file for complete search history.

(56) References Cited

U.S. PATENT DOCUMENTS

| | | | |
|---|---|---|---|
| 8,034,291 B2* | 10/2011 | Qi | F01N 3/208 422/62 |
| 9,638,122 B2* | 5/2017 | Smith | F02D 41/0235 |
| 2009/0000278 A1* | 1/2009 | Ichikawa | B01D 53/90 60/286 |
| 2010/0028230 A1* | 2/2010 | Gady | F01N 3/208 423/239.1 |
| 2010/0076666 A1* | 3/2010 | Yanakiev | F01N 3/023 701/103 |
| 2012/0227383 A1* | 9/2012 | Charial | F01N 3/0231 60/274 |

(Continued)

*Primary Examiner* — Audrey K Bradley
*Assistant Examiner* — Anthony Ayala Delgado
(74) *Attorney, Agent, or Firm* — Cantor Colburn LLP

(57) ABSTRACT

Technical solutions are described for an emissions control system for a motor vehicle including an internal combustion engine. The emissions control system includes a reductant injector device, a selective catalytic reduction (SCR) device, and a controller. The controller determines a reductant energizing time for the reductant injector device based on one or more operating conditions of the SCR device. The controller further computes a diagnostic adaptation factor for the reductant energizing time based on an on-board diagnostic signal. The controller further inputs an amount of reductant into the SCR device by adjusting a reductant energizing time of the reductant injector device according to the diagnostic adaptation factor.

15 Claims, 8 Drawing Sheets

(56) References Cited

U.S. PATENT DOCUMENTS

| | | | |
|---|---|---|---|
| 2014/0122020 A1* | 5/2014 | Kowalkowski | G06F 17/18 |
| | | | 702/179 |
| 2014/0199219 A1* | 7/2014 | Christner | F01N 3/208 |
| | | | 423/212 |
| 2016/0369677 A1* | 12/2016 | Ponnathpur | F01N 3/208 |
| 2017/0356322 A1* | 12/2017 | Farid | F01N 11/007 |

* cited by examiner

SELECTIVE CATALYTIC REDUCTION DOSING CONTROL

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. The SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. However, if the reduction reaction rate is too slow, or if there is excess ammonia in the exhaust, ammonia can slip from the SCR. On the other hand, if there is too little ammonia in the exhaust, SCR NOx conversion efficiency will be decreased.

SUMMARY

One or more embodiments describe an emissions control system for a motor vehicle including an internal combustion engine. The emissions control system includes a reductant injector device, a selective catalytic reduction (SCR) device, and a controller. The controller determines an energizing time for the reductant injector device based on one or more operating conditions of the SCR device. The controller further computes a diagnostic adaptation factor to be applied to the reductant energizing time based on an on-board diagnostic signal. The controller further inputs an amount of reductant into the SCR device by adjusting a reductant energizing time of the reductant injector device according to the diagnostic adaptation factor.

In addition to one or more of the features described herein the controller inputs the amount of reductant into the SCR device by instructing the reductant injector module. In one or more examples, the diagnostic adaptation factor is further based on a difference between a predicted NOx value in exhaust gases and measured NOx value in the exhaust gases. For example, the predicted NOx value is based on a chemical model of the SCR device. In one or more examples, the diagnostic adaptation factor is independent of the chemical model.

In one or more examples, the on-board diagnostic signal include a plurality of diagnostic signals and the diagnostic adaptation factor is computed as a function of the plurality of diagnostic signals. In one or more examples, the diagnostic adaptation factor is computed based on an exponentially weighted moving average of the on-board diagnostic signal.

In one or more examples, computing the diagnostic adaptation factor includes determining a diagnostic factor based on the on-board diagnostic signal, comparing the diagnostic factor with a predetermined threshold, and in response to the diagnostic factor being greater than the predetermined threshold, computing the diagnostic adaptation factor as a maximum of the diagnostic factor and a predetermined long-term adaptation factor. Alternatively, the method includes, in response to the diagnostic factor not being greater than the predetermined threshold, computing the diagnostic adaptation factor as a minimum of the diagnostic factor and the predetermined long-term adaptation factor. Further, in one or more examples, the controller sets the diagnostic adaptation factor as the long-term adaptation factor.

In other exemplary embodiments an exhaust system for an internal combustion engine is described that performs a selective catalytic reduction (SCR) of exhaust gas. The exhaust system includes a controller that computes a diagnostic adaptation factor for an SCR device of the exhaust system based on an on-board diagnostic signal. The controller further inputs an amount of reductant into the SCR device by configuring the SCR device according to the diagnostic adaptation factor.

In yet other exemplary embodiments a computer-implemented method is described for controlling a selective catalytic reduction (SCR) device of an exhaust system of an internal combustion engine. The method includes computing a diagnostic adaptation factor for an SCR device of the exhaust system based on an on-board diagnostic signal. The method also includes inputting an amount of reductant into the SCR device by configuring the SCR device according to the diagnostic adaptation factor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
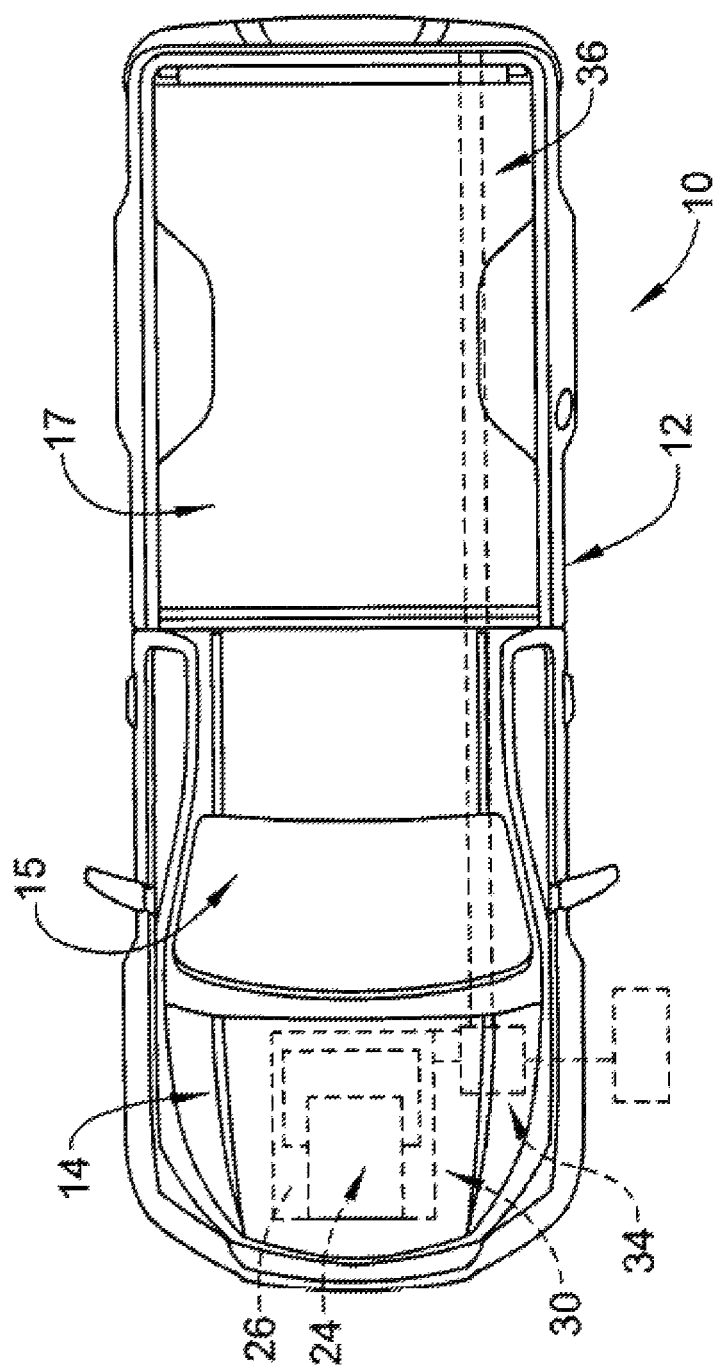
FIG. 1 depicts a motor vehicle including an internal combustion engine and an emission control system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the exemplary embodiment shown, may include a diesel engine 26. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore when reference is made to a vehicle, such disclosure should be interpreted as applicable to any application of an ICE system.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 26 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
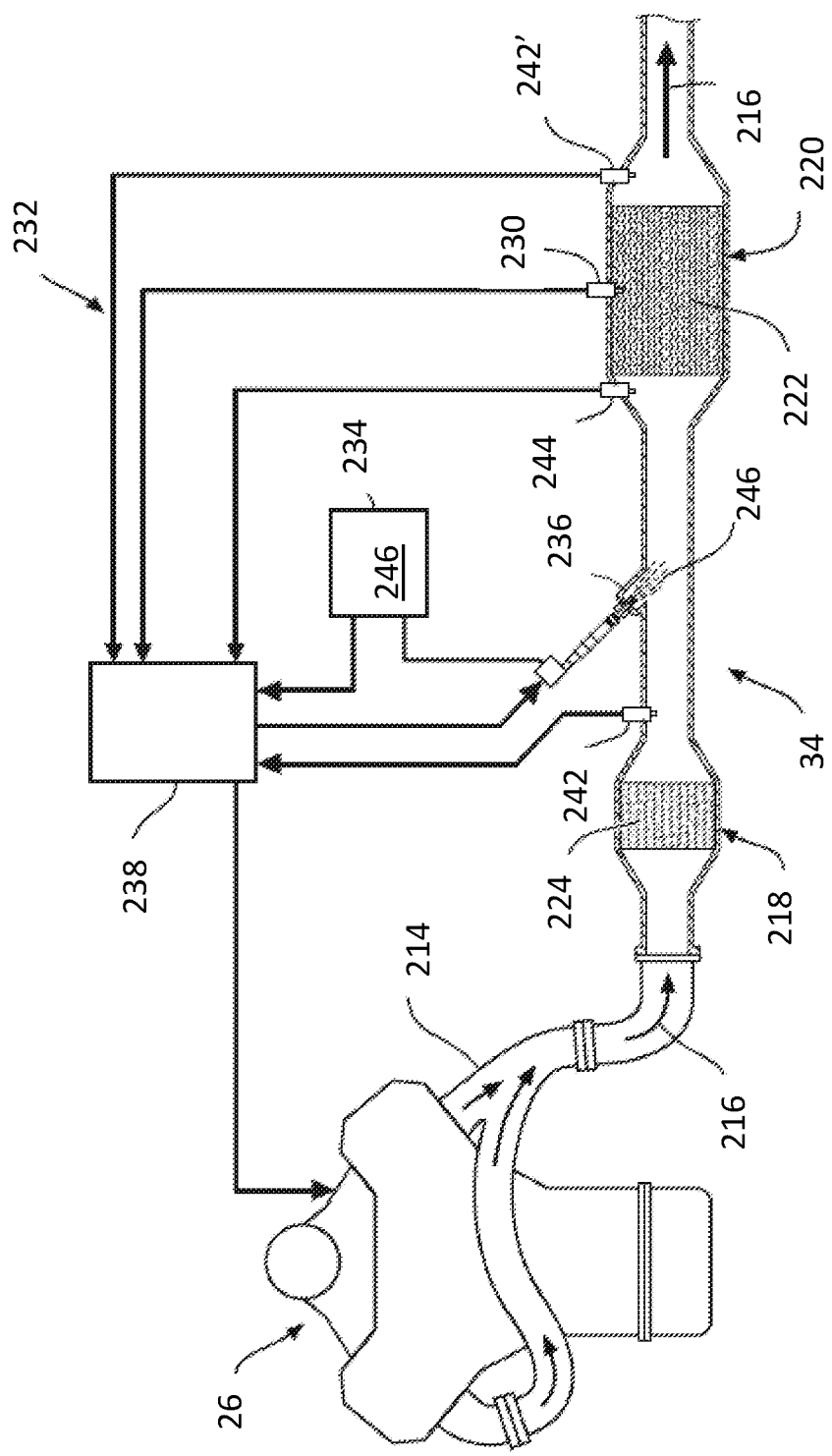
FIG. 2 illustrates example components of an emissions control system according to one or more embodiments.

FIG. 2 illustrates example components of the emissions control system 34 according to one or more embodiments. It should be noted that while the internal combustions engine system 24 includes a diesel engine 26 in the above example, the emissions control system 34 described herein can be implemented in various engine systems. The emissions control system 34 facilitates the control and monitoring of $NO_x$ storage and/or treatment materials, to control exhaust produced by the internal combustion engine system 24. For example, the technical solutions herein provide methods for controlling selective catalytic reduction (SCR) devices, and appurtenant $NO_x$ sensors, wherein the SCR Devices are configured to receive exhaust gas streams from an exhaust gas source. As used herein, "$NO_x$" refers to one or more nitrogen oxides. NOx species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR Devices are configured to receive reductant, such as at variable dosing rates as will be described below.

The exhaust gas conduit 214, which may comprise several segments, transports exhaust gas 216 from the engine 26 to the various exhaust treatment devices of the emissions control system 34. For example, as illustrated, the emission control system 34 includes a SCR device 220. In one or more examples, the SCR device 220 can include a selective catalytic filter (SCRF) device, which provides the catalytic aspects of SCRs in addition to particulate filtering capabilities. Alternatively, or in addition, the SCR device 220 can also be coated on a flow through substrate. As can be appreciated, system 34 can include various additional treatment devices, including an oxidation catalyst (OC) devices 218, and particulate filter devices (not shown), among others.

As can be appreciated, the OC Device 218 can be of various flow-through, oxidation catalyst devices known in the art. In various embodiments the OC Device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC Device 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the SCR Device, the catalyst compositions for the SCR function and $NH_3$ oxidation function can reside in discrete washcoat layers on the substrate or, alternatively, the compositions for the SCR and $NH_3$ oxidation functions can reside in discrete longitudinal zones on the substrate.

The SCR device 220 may be disposed downstream from the OC Device 218. In one or more examples, the SCR Device 220 includes a filter portion 222 that can be a wall flow filter, which is configured to remove carbon and other particulate matter from the exhaust gas 216. In at least one exemplary embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR Device 220 receives reductant, such as at variable dosing rates. Reductant 246 can be supplied from a reductant supply source (not shown) and injected into the exhaust gas conduit 214 at a location upstream of the SCR Device 220 using an injector 236, or other suitable method of delivery. The reductant 246 can be in the form of a gas, a liquid, or an aqueous solution, such as an aqueous urea solution. In one or more examples, the reductant 246 can be mixed with air in the injector 236 to aid in the dispersion of the injected spray. The catalyst containing washcoat disposed on the filter portion 222 or a flow through catalyst or a wall flow filter may reduce NOx constituents in the exhaust gas 216. The SCR Device 220 may utilize the reductant 246, such as ammonia ($NH_3$), to reduce the NOx. The catalyst containing washcoat may contain a zeolite and one or more base metal components such as iron (Fe), cobalt (Co), copper (Cu), or vanadium (V), which can operate efficiently to convert NOx constituents of the exhaust gas 216 in the presence of $NH_3$. In one or more examples, a turbulator (i.e., mixer) (not shown) can also be disposed within the exhaust conduit 214 in close proximity to the injector 236 and/or the SCR Device 220 to further assist in thorough mixing of reductant 246 with the exhaust gas 216 and/or even distribution throughout the SCR Device 220.

The emissions control system 34 further includes a reductant delivery system 232 that introduces a reductant to the exhaust gas 216. The reductant delivery system 232 includes a reductant supply 234, an injector 236. The reductant supply 234 stores the reductant 246 and is in fluid communication with the injector 236. The reductant 246 may include, but is not limited to, $NH_3$. Accordingly, the injector 236 may inject a selectable amount of reductant 246 into the exhaust gas conduit 214 such that the reductant 246 is introduced to the exhaust gas 216 at a location upstream of the SCR Device 220.

In one or more examples, the emissions control system 34 further includes a control module 238 operably connected via a number of sensors to monitor the engine 26 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute a SCR chemical model, as described below. The control module 238 can be operably connected to ICE system 24, SCR Device 220, and/or one or more sensors. As shown, the sensors 240 can include an upstream $NO_x$ sensor 242 and downstream $NO_x$ sensor 242', disposed downstream of SCR Device 220, each of which are in fluid communication with exhaust gas conduit 214. In one or more examples, the upstream NOx sensor 242 is disposed downstream of the ICE 26 and upstream of both SCR Device 220 and the injector 236. The upstream $NO_x$ sensor 242 and the downstream $NO_x$ sensor 242' detect a $NO_x$ level proximate their location within exhaust gas conduit 214, and generate a NOx signal, which corresponds to the NOx level. A NOx level can comprise a concentration, a mass flow rate, or a volumetric flow rate, in some embodiments. A NOx signal generated by a NOx sensor can be interpreted by control module 238, for example. Control module 238 can optionally be in communication one or more temperature sensors, such as upstream temperature sensor 244, disposed upstream from SCR Device 220.

The sensors of the emissions control system 34 may further include at least one pressure sensor 230 (e.g., a delta pressure sensor). The delta pressure sensor 230 may determine the pressure differential (i.e., $\Delta p$) across the SCR Device 220. Although a single delta pressure sensor 230 is illustrated, it is appreciated that a plurality of pressure sensors may be used to determine the pressure differential of the SCR Device 220. For example, a first pressure sensor may be disposed at the inlet of the SCR Device 220 and a second pressure sensor may be disposed at the outlet of the SCR 220. Accordingly, the difference between the pressure detected by the second delta pressure sensor and the pressure detected by the first delta pressure sensor may indicate the pressure differential across the SCR 220. It should be noted that in other examples, the sensors can include different, additional, or fewer sensors than those illustrated/described herein.

In one or more examples, the SCR Device 220 includes one or more components that utilize the reductant 246 and a catalyst to transform NO and $NO_2$ from the exhaust gases 216. The SCR Device 220 can include, for example, a flow-through ceramic or metal monolith substrate that can be packaged in a shell or canister having an inlet and an outlet in fluid communication with the exhaust gas conduit 214 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 216. Some specific examples of materials that can be used include ceramics such as extruded cordierite, $\alpha$-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR catalyst composition is generally a porous and high surface area material which can operate efficiently to convert $NO_x$ constituents in the exhaust gas 216 in the presence of a reductant 246, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a $\beta$-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR Catalyst generally uses a reductant 246 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 246 can be ammonia ($NH_3$), such as anhydrous ammonia or aqueous ammonia, or generated from a nitrogen and hydrogen rich substance such as urea ($CO(NH_2)_2$). Additionally or alternatively, the reductant 246 can be any compound capable of decomposing or reacting in the presence of exhaust gas 216 and/or heat to form ammonia. Equations (1)-(5) provide exemplary chemical reactions for $NO_x$ reduction involving ammonia.

$$6NO+4NH_3 \rightarrow 5N_2+6H_2O \tag{1}$$

$$4NO+4NH_3+O_2 \rightarrow 4N_2+6H_2O \tag{2}$$

$$6NO_2+8NH_3 \rightarrow 7N_2+12H_2O \tag{3}$$

$$2NO_2+4NH_3+O_2 \rightarrow 3N_2+6H_2O \tag{4}$$

$$NO+NO_2+2NH_3 \rightarrow 2N_2+3H_2O \tag{5}$$

It should be appreciated that Equations (1)-(5) are merely illustrative, and are not meant to confine the SCR Device 220 to a particular NOx reduction mechanism or mechanisms, nor preclude the operation of other mechanisms. The SCR Device 220 can be configured to perform any one of the above NOx reduction reactions, combinations of the above NOx reduction reactions, and other NOx reduction reactions.

The reductant 246 can be diluted with water in various implementations. In implementations where the reductant 246 is diluted with water, heat (e.g., from the exhaust) evaporates the water, and ammonia is supplied to the SCR Device 220. Non-ammonia reductants can be used as a full or partial alternative to ammonia as desired. In implementations where the reductant 245 includes urea, the urea reacts with the exhaust to produce ammonia, and ammonia is supplied to the SCR Device 220. Reaction (6) below provides an exemplary chemical reaction of ammonia production via urea decomposition.

$$CO(NH_2)_2+H_2O \rightarrow 2NH_3+CO_2 \tag{6}$$

It should be appreciated that Equation (6) is merely illustrative, and is not meant to confine the urea or other reductant 246 decomposition to a particular single mechanism, nor preclude the operation of other mechanisms.

The SCR Catalyst can store (i.e., absorb, and/or adsorb) reductant for interaction with exhaust gas 216. For example, the reductant 246 can be stored within the SCR Device 220 or catalyst as ammonia. A given SCR Device 220 has a reductant capacity, or an amount of reductant or reductant derivative it is capable of storing. The amount of reductant stored within an SCR Device 220 relative to the SCR Catalyst capacity can be referred to as the SCR "reductant loading", and can be indicated as a % loading (e.g., 90% reductant loading) in some instances. During operation of SCR Device 220, injected reductant 246 is stored in the SCR Catalyst and consumed during reduction reactions with NOx species and must be continually replenished. Determining the precise amount of reductant 246 to inject is critical to maintaining exhaust gas emissions at acceptable levels: insufficient reductant levels within the system 34 (e.g., within SCR Device 220) can result in undesirable NOx species emissions ("NOx breakthrough") from the system (e.g., via a vehicle tailpipe), while excessive reductant 246 injection can result in undesirable amounts of reductant 246 passing through the SCR Device 220 unreacted or exiting the SCR Device 220 as an undesired reaction product ("reductant slip"). Reductant slip and NOx breakthrough can also occur when the SCR Catalyst is below a "light-off" temperature. SCR dosing logic can be utilized to command reductant 246 dosing, and adaptations thereof, and can be implemented by module 238, for example.

A reductant injection dosing rate (e.g., grams per second) can be determined by a SCR chemical model which predicts the amount of reductant 246 stored in the SCR Device 220 based on signals from one or more of reductant 246 injection (e.g., feedback from injector 236) and upstream NOx (e.g., NOx signal from upstream NOx sensor 242). The SCR chemical model further predicts NOx levels of exhaust gas 216 discharged from the SCR 220. The SCR chemical model can be implemented by module 238. The SCR chemical model can be updatable by one or more process values over time, for example. A dosing governor (not shown), such as one controlled by module 238, monitors the reductant storage level predicted by the SCR chemical model, and compares the same to a desired reductant storage level. Deviations between the predicted reductant storage level and the desired reductant storage level can be continuously monitored and a dosing adaptation can be triggered to increase or decrease reductant dosing in order to eliminate or reduce the deviation. For example, the reductant dosing rate can be adapted to achieve a desired $NO_x$ concentration or flow rate in exhaust gas 216 downstream of the SCR Device 220, or achieve a desired $NO_x$ conversion rate. A desired conversion rate can be determined by many factors, such as the characteristics of SCR Catalyst type and/or operating conditions of the system (e.g., ICE 26 operating parameters).

Over time, inaccuracies of the SCR chemical model can compound to appreciative errors between modeled SCR reductant loading and actual loading. Accordingly, the SCR chemical model can be continuously corrected to minimize or eliminate errors. One method for correcting an SCR chemical model includes comparing the modeled SCR discharge exhaust gas NOx levels to the actual NOx levels (e.g., as measured by downstream NOx sensor 242') to determine a discrepancy, and subsequently correcting the model to eliminate or reduce the discrepancy. Because NOx sensors (e.g., downstream NOx sensor 242') are cross-sensitive to reductant (e.g., $NH_3$) and NOx, it is critical to distinguish between reductant signals and NOx signals as reductant slip can be confused with insufficient NOx conversion.

In one or more examples, a passive analysis technique used to distinguish between reductant signals and NOx signals is a correlation method which includes comparing the upstream NOx concentration (e.g., such as measured by upstream NOx sensor 242) movement with the downstream NOx concentration (e.g., such as measured by downstream NOx sensor 242'), wherein diverging concentration directions can indicate an increase or decrease in reductant slip. For example, if the upstream NOx concentration decreases and downstream NOx concentration increases, reductant slip can be identified as increasing. Similarly, if the upstream NOx concentration increases and downstream NOx concentration decreases, reductant slip can be identified as decreasing. Alternatively, or in addition, a second passive analysis technique used to distinguish between reductant signals and NOx signals is a frequency analysis. NOx signals generated by NOx sensors can include multiple frequency components (e.g., high frequency and low frequency) due to the variation of the NOx and reductant concentrations during transient conditions. High frequency signals generally relate only to NOx concentration, while low frequency signals generally relate to both NOx concentration and reductant concentration. High frequency signals for upstream NOx and downstream NOx are isolated and used to calculate a SCR NOx conversion ratio, which is then applied to the isolated low pass upstream NOx signal to determine a low frequency downstream NOx signal. The calculated low frequency downstream NOx signal is then compared to the actual isolated low frequency downstream NOx signal, wherein a deviation between the two values can indicate reductant slip.

A drawback of passive analysis techniques such as the correlation method and frequency method described above is that they rely on the proper operation of two NOx sensors. For example, a faulty upstream NOx sensor (e.g., upstream NOx sensor 242) can generate a NOx signal which is lower than the actual NOx level proximate the upstream NOx sensor causing the SCR chemical model to predict higher reductant storage than the actual storage. Accordingly, NOx breakthrough would be incorrectly identified as reductant slip, and reductant dosing would be commanded such that NOx breakthrough would be exacerbated (i.e., reductant dosing would be decreased). Further, the SCR chemical model would be updated using the inaccurate upstream NOx measurement, and the exacerbated NOx breakthrough would endure. Additionally or alternatively, in a similar manner an $NH_3$ slip can be incorrectly interpreted as NOx breakthrough.

Another drawback of the correlation and frequency passive analysis techniques is that they cannot be implemented while the SCR is in steady state. "Steady state" is determined, for example, by taking the root mean square value of a NOx signal upstream from SCR Device 220 (e.g., such as measured by upstream NOx sensor 242) over a moving time frame; a sufficiently small value indicates a minimal variation in upstream NOx concentration and the SCR can be considered to be in steady state. For example, a steady state condition can be comprise a root mean square value of the upstream NOx concentration of less than a predetermined value, such as about 30 ppm, less than about 20 ppm, or less than about 10 ppm. SCR steady state conditions can often correlate with ICE 26 steady state conditions (e.g., generally consistent RPM, fuel injection, temperature, etc.) Intrusive tests can be used to distinguish between reductant signals and NOx signals, which include halting all or most reductant dosing for a period of time. While intrusive tests can be performed under steady state conditions, they can, in some circumstances, yield undesirable exhaust emissions during the test period, such as emissions with an increased NOx concentration.

Figure 3:
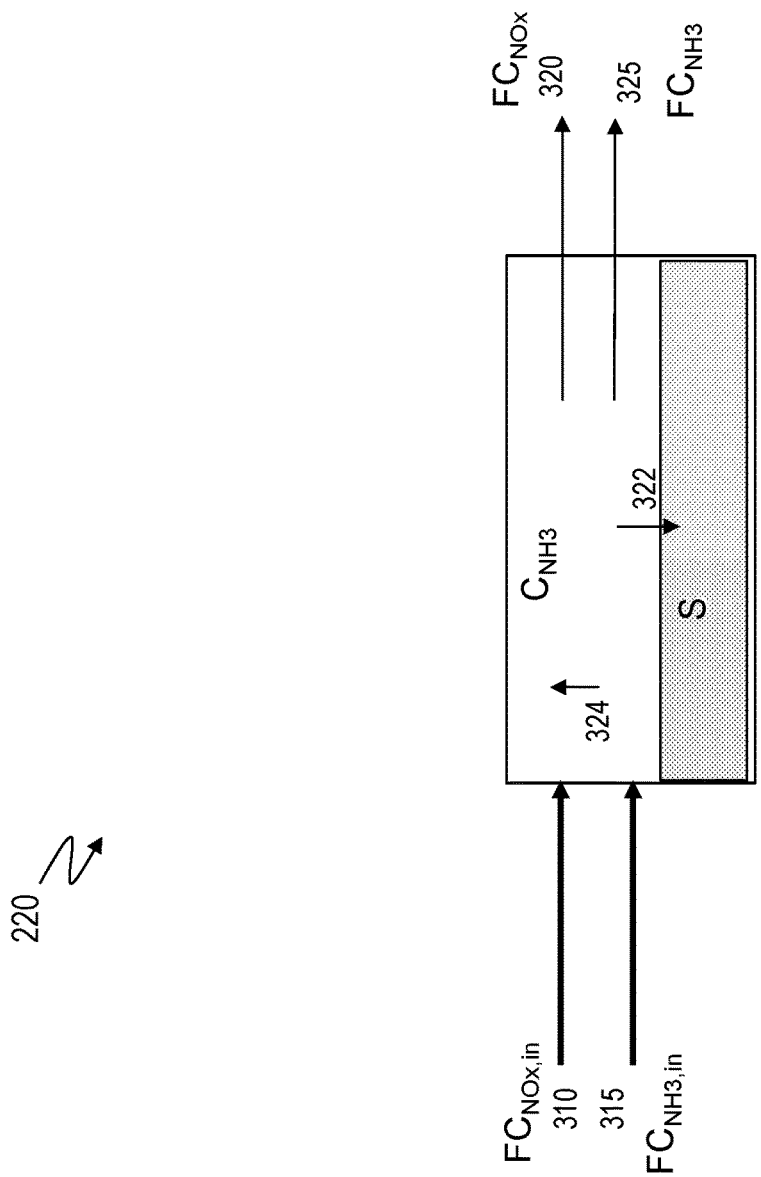
FIG. 3 illustrates an example flow of the gases through an SCR device, according to one or more embodiments.

FIG. 3 illustrates an example flow of the gas exhaust through the SCR Device 220, according to one or more embodiments. The control module 238 measures the flow rate (F) of gas volume, and concentration C of the gas. For example, the SCR 220 determines an input flow-rate of NOx 310 as $FC_{NOx,in}$, where F is the volume of the incoming gas 216, and $C_{NOx,in}$ is the inlet concentration of NOx in the incoming gas 216. Similarly, $FC_{NH3,in}$ is the volume of the flow-rate of $NH_3$ 315 in the incoming gas 216, $C_{NH3,in}$ being the inlet concentration of $NH_3$. Further, compensating for the amount of adsorption 322 and amount of desorption 324, and the amounts reacted on the catalyst surface, the control module 238 may determine $C_{NH3}$ as the SCR concentration of $NH_3$, and $C_{NOx}$ as SCR concentration of NOx.

Accordingly, $FC_{NOx}$ is the NOx outlet volume flow rate 320 of $NO_x$ through the outlet of the SCR Device 220. In one or more examples, the control module 238 may determine $W_{NOx}FC_{NOx}$ as mass flow rate of NOx, where $W_{NOx}$ is the molecular weight of NOx. Similarly, for $NH_3$, the outlet volume flow rate 325 is $FC_{NH3}$ with the mass flow rate of $NH_3$ being $W_{NH3}FC_{NH3}$.

As described earlier, the control module 238 controls the reductant injection rate precisely; such as ammonia producing urea aqueous solution injection rate. An insufficient injection may result in unacceptably low NOx conversions. An injection rate that is too high results in release of ammonia to the atmosphere. These ammonia emissions from SCR systems are known as ammonia slip.

Accordingly, referring back to FIG. 2, the control module 238 controls operation of the injector 236 based on the chemical model and desired NH3 storage setpoint to determine an amount of reductant 246 to be injected as described herein. The control module 238 may determine a correction coefficient corresponding to the reductant storage based on monitoring the one or more sensors, and may more precisely control the amount of injected reductant provided by the injector 236. For example, the control module 238 determines a reductant injector energizing time correction coefficient to further reduce or eliminate discrepancy between the chemical model and actual SCR outlet NOx emissions. Alternatively, or in addition, the control module 238 determines a $NH_3$ set-point correction to reduce or eliminate discrepancy between the chemical model and actual SCR outlet NOx emissions. Accordingly, the supply of reductant 246 may be utilized more efficiently. For example, the reducing agent injected into the exhaust gas 216 may form $NH_3$ when injected into the exhaust gas 216. Accordingly, the control module 238 controls an amount of $NH_3$ supplied to the SCR Device 220. The SCR Catalyst adsorbs (i.e., stores) $NH_3$. The amount of $NH_3$ stored by the SCR Device 220 may be referred to hereinafter as an "$NH_3$ storage level." The control module 238 may control the amount of $NH_3$ supplied to the SCR Device 220 to regulate the $NH_3$ storage level. $NH_3$ stored in the SCR Device 220 reacts with NOx in the exhaust gas 216 passing therethrough.

In one or more examples, the percentage of NOx that is removed from the exhaust gas 216 entering the SCR Device 220 may be referred to as a conversion efficiency of the SCR Device 220. The control module 238 may determine the conversion efficiency of the SCR Device 220 based on $NOx_{in}$ and $NOx_{out}$ signals generated by the first (upstream) NOx sensor 242 and second (downstream) NOx sensor 242' respectively. For example, the control module 238 may determine the conversion efficiency of the SCR Device 220 based on the following equation:

$$SCR_{eff}=(NOx_{in}-NOx_{out})/NOx_{in} \qquad (7)$$

$NH_3$ slip can also be caused because of an increase in the temperature of the SCR Catalyst 220. For example, $NH_3$ may desorb from the SCR Catalyst 220 when the temperature increases at times when the $NH_3$ storage level is near to the maximum $NH_3$ storage level. $NH_3$ slip may also occur due to an error (e.g., storage level estimation error) or faulty component (e.g., faulty injector) in the emissions control system 34.

Typically, the control module 238 estimates an $NH_3$ storage level of the SCR Device 220 based on the chemical model. In one or more examples, the $NH_3$ storage set-point ("set-point") is calibrate-able. The control module 238 uses the chemical model to estimate the current storage level of $NH_3$ in the SCR Device 220, and a storage level governor provides feedback to the injection controls to determine the injection rate to provide $NH_3$ for reactions according to the chemical model and to maintain a target storage level. The set-point may indicate a target storage level for given operating conditions (e.g., a temperature of the SCR Catalyst 220). Accordingly, the set-point may indicate a storage level (S) and a temperature (T) of the SCR Device 220. The set-point may be denoted as (S, T). The control module 238 controls the reductant injector 236 to manage the amount of reducing agent injected into the exhaust gas 216 to adjust the storage level of the SCR Device 220 to the set-point. For example, the control module 238 commands the injector 236 to increase or decrease the storage level to reach the set-point when a new set-point is determined. Additionally, the control module 238 commands the reductant injector 236 to increase or decrease the storage level to maintain the set-point when the set-point has been reached.

The technical features described herein facilitate the control module 238 determine and maintain the storage level S of the SCR Device 220 to optimize performance by determining a correction factor based on diagnostic information about one or modules from the vehicle 10. The technical features thus facilitate the emissions control system 34 to operate in compliance with one or more emissions threshold that may be set per environmental regulations. The technical features herein improve the operation of the SCR Device 220 by facilitating the control module 238 to dynamically determine a diagnostic adaptation factor to improve the operation thereof. In one or more examples, the diagnostic adaptation factor is applied directly to the reductant injector control as a multiplier to the injector energizing time or to the storage setpoint control as a multiplier to the NH3 storage set-point. The technical features herein couple the SCR kinetics model with the dynamically determined correction factor to meet the emissions thresholds even in fault conditions. The technical features herein thus facilitate the emissions control system 34 to adapt the SCR 220 in fault conditions to meet emissions threshold.

In one or more examples, the control module 238 uses the chemical model of the SCR Catalyst to predict the NOx concentration in the exhaust gases 216 entering the SCR Device 220. Further, based on the predicted NOx concentration, the control module 238 determines an amount of NH3 with which to dose the exhaust gases 216 to satisfy the emissions threshold. The control module 238 typically implements an adaptive closed loop/semi-closed loop control strategy to maintain SCR performance according to the chemical model, where the control module continuously learns one or more parameters associated with the chemical model according to the ongoing performance of the motor vehicle 10. However, in case of performance degradation of one or more subsystems of the motor vehicle 10, the adaptive control strategy may learn one or more parameters in a wrong direction.

For example, the adaptation control strategy does not work well with NOx sensor faults, or other system faults, because the fault impacts the sensor signal response and thus the ability to use the sensors for slip vs breakthrough determination. In many cases with these faults present, adaptation learns in the wrong direction or does not learn to a high enough value to meet emissions threshold within the defined prep cycles. Also, for some applications adaptation enablement conditions are not satisfied long enough to provide sufficient adaptation. Accordingly, the control module 238 computes a diagnostic adaptation factor based on results from one or more diagnostic modules in the vehicle 10, which is applied to the reductant injector control as a multiplier to the injector energizing time and/or as a multiplier to the storage set-point.

A technical challenge for an exhaust system using an adaptive control strategy in the presence of diagnostic faults is that in the case NOx sensors are faulted, the signal from the NOx sensors are impacted, which makes slip vs NOx breakthrough determination unreliable. The technical challenges further includes that the controller module 238 has a limited amount of time to adapt in the presence of a fault based on regulatory requirements (for example, less than 1 hour). A typical adaptive strategy can make the adaptive control aggressive in case of such limited time requirements, which in turn negatively impacts the adaptive control in non-faulted conditions. The technical solutions herein decouple adaptation for non-faulted state usage from adaptation to recover performance in a faulted state.

Figure 4:
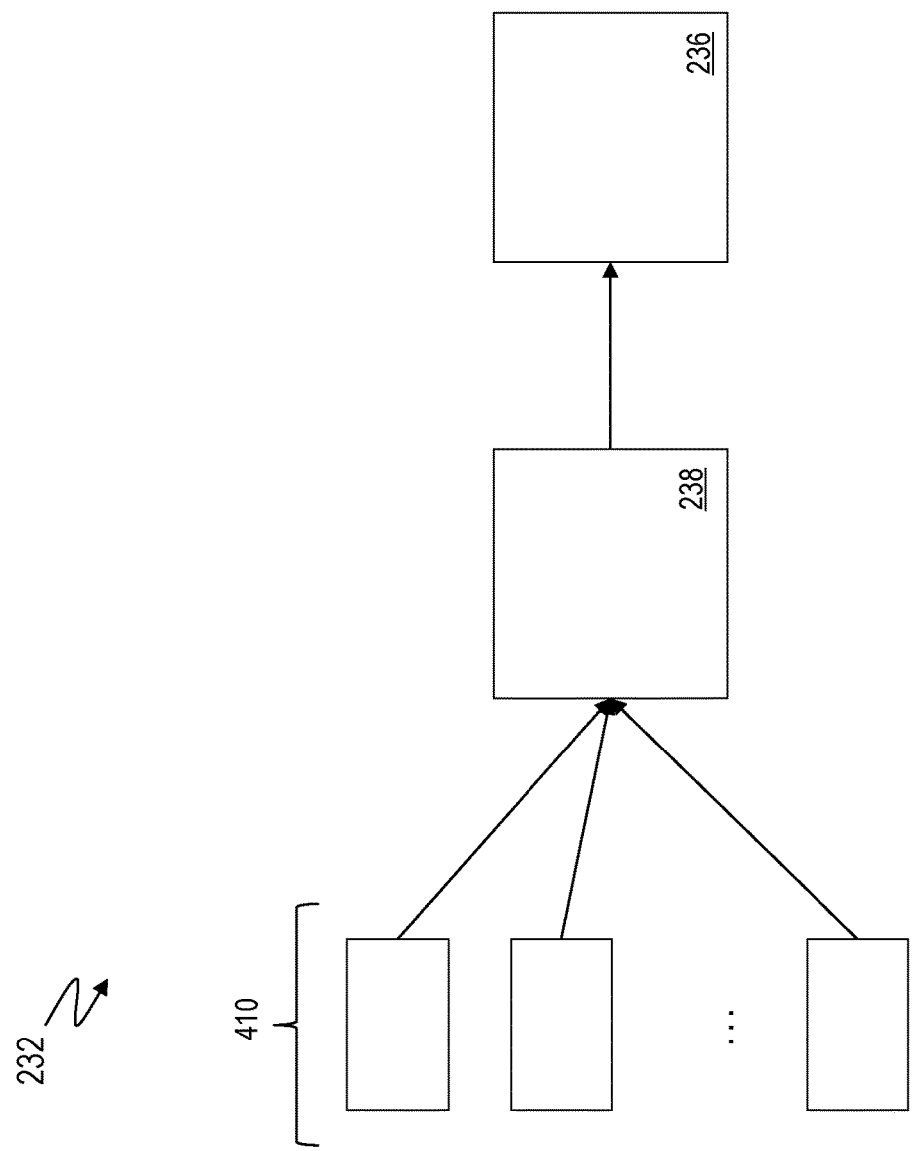
FIG. 4 illustrates an example of the reductant delivery system, according to one or more embodiments.

FIG. 4 illustrates an example of the reductant delivery system, according to one or more embodiments. The control module 238 instructs the reductant injector 236 to inject a specific amount of the reductant, such as urea, to change the $NH_3$ storage level S, in turn to reduce the NOx concentration in the exhaust gases 216. The control module 238 determines the correction factor to adjust the amount of the reductant to inject based on input received from diagnostic modules.

For example, the technical features herein facilitate the control module 238 to modify the predictions that are made based on the chemical model of the SCR Catalyst according to inputs received from one or more diagnostics modules 410 of the motor vehicle 10. The diagnostics module 410 may be on-board diagnostics (OBD) modules that monitor performance of one or more subsystems of the vehicle 10.

In one or more examples, the diagnostic modules 410 that provide corresponding subsystem performance information to the control module 238 only include the diagnostic modules 410 monitoring the emissions control system 34. Alternatively, or in addition, the diagnostic modules 410 selectively send only the performance information associated with the emissions control system 34 to the control module 238. For example, the emissions control system 34 may be in a fault-condition, such as faulty injector 236, or any other component. Alternatively, or in addition, a fault condition may be caused by a reductant injector, a delivery system, a faulty NOx sensor, or any other component malfunction.

One or more of the above fault conditions may cause the control module 238 to adapt the reductant injection in the wrong direction or, in or more examples, not learn to a high enough value to meet emissions threshold within a pre-defined number of preparation cycles that are used for adjusting the parameters of the kinetics model. For example, the control module 238 modifies the reductant injection in response to an incorrect slip detection decision that may lead to an adaptation in the wrong direction. Alternatively, or in addition, the control module 238 adjusts the parameters of a model used to predict DEF injection quantity in response to one or more adaptation enablement conditions being satisfied at least for a predetermined duration. For example, the enablement conditions may include exhaust flow, exhaust temperature, engine and after-treatment stability criteria, among others. Further, the control module 238 adjusts the parameters of the kinetics model if the one or more enablement conditions are satisfied at least for the predetermined duration, such as 100 microseconds, 2 seconds, 5 seconds, and so on.

Figure 5:
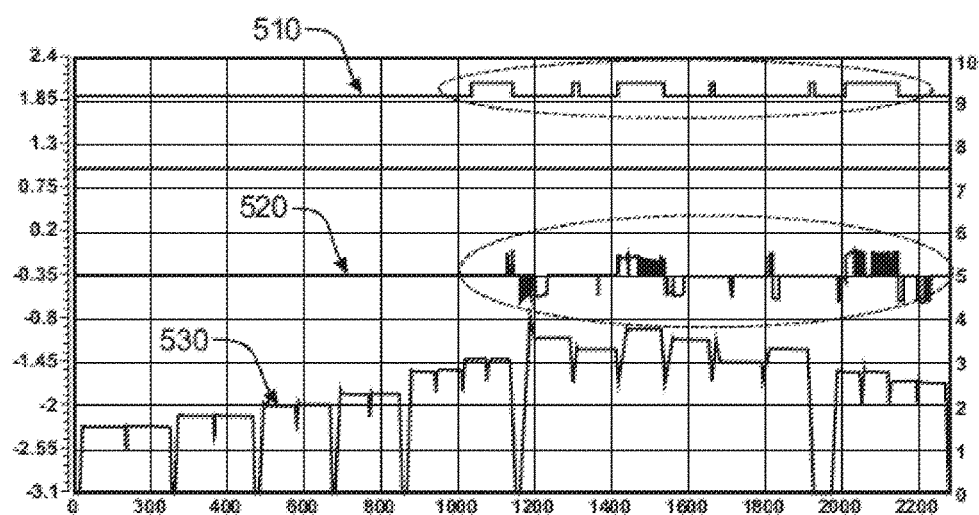
FIG. 5 illustrates an example scenario of under dosing an SCR device, according to one or more embodiments.

FIG. 5 illustrates an example scenario of underdosing the SCR Device 220, according to one or more embodiments. In the example scenario an upstream NOx predicted value is 30% of the actual NOx sensor reading. The prediction value results in an under dosing the as illustrated. The under dosing may cause NOx breakthrough, which the controls may misinterpret as slip causing NH3 slip detection flag to be true. This further results in the control module 238 incorrectly adapting the storage level S to compensate for the $NH_3$ slip, thus preventing the control module 238 from adapting to prevent the misdetected NOx breakthrough.

The technical features herein address the technical challenges above by determining a calibrate-able long-term adaptation factor or multiplier for the $NH_3$ storage set-point to be used for injecting the reductant. Accordingly, the control module 38 uses the adaptation factor for the $NH_3$ storage level S to instruct the reductant injector 236 about the quantity of reductant to inject in the exhaust gas 216, in addition to relying on the control module 238 to be adapted on a specific test cycle in a short period of time.

Figure 6:
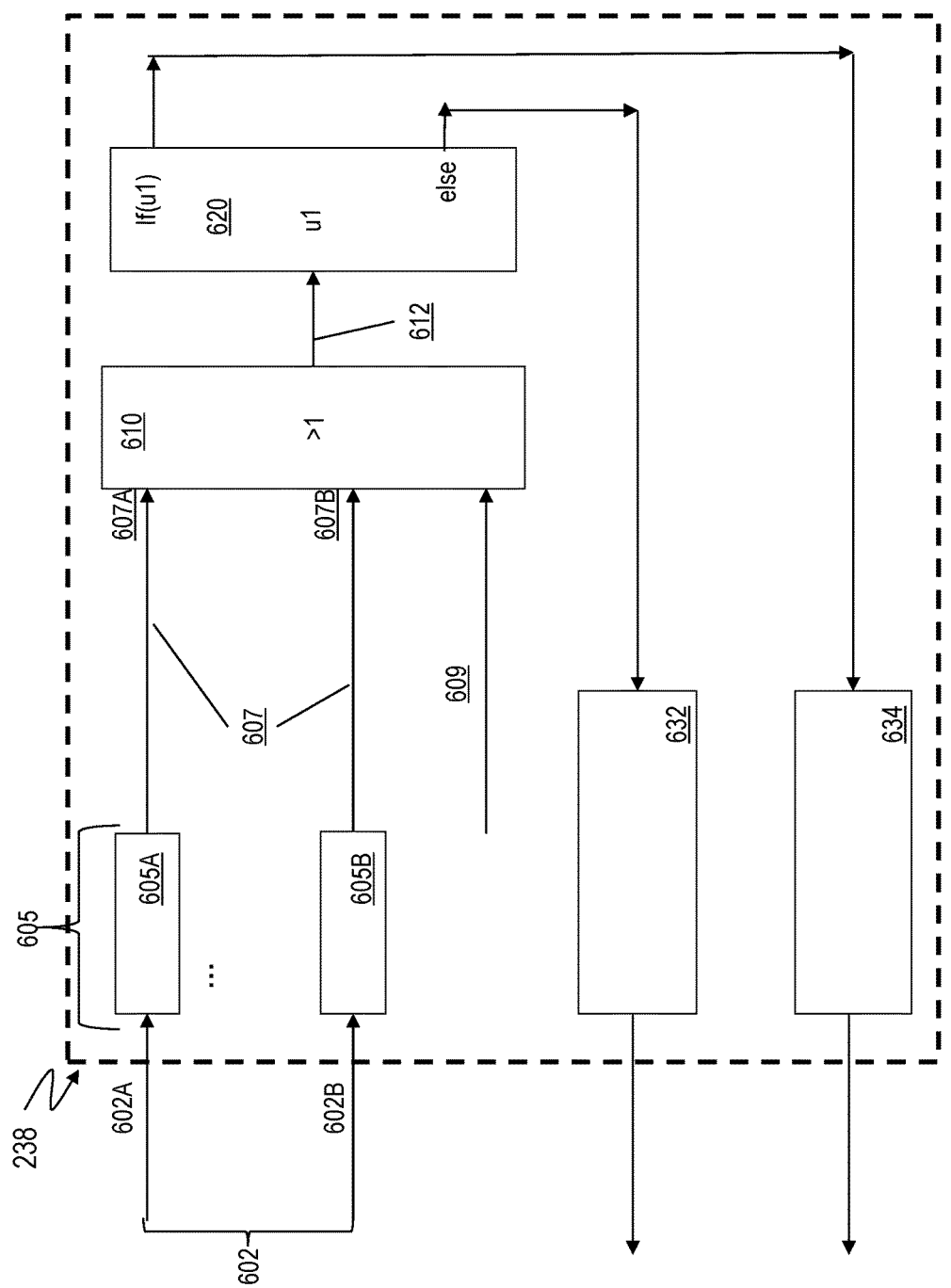
FIG. 6 illustrates example components of a control module, according to one or more embodiments.

FIG. 6 illustrates example components of the control module 238, according to one or more embodiments. The components facilitate determining a scaling factor for a reductant injector energizing time. Alternatively, or in addition, the control module 238 uses the scaling factor for the $NH_3$ storage level S in the set-point. The reductant injector energizing time determines an amount of time the injector 236 supplies the reductant 246 to the SCR Device 220. If the injector 236 has a predetermined flow rate, by controlling the energizing duration of the injector 236, the control module 238 controls the quantity of reductant 246 injected by the injector 236. The components illustrated can be implemented using electronic circuits, for example application specific integrated circuits (ASIC), field programmable gate arrays (FPGA), and the like. Alternatively, or in addition, the components may be implemented as computer executable instructions executed by the control module 238, and/or any other processing unit.

The control module 238 receives input signals 602 from the one or more diagnostics module(s) 410. In one or more examples, the input signals 602 indicate the performance status of corresponding subsystems of the vehicle 10 and/or the emissions control system 34. For example, the input signals 602 may indicate that a subsystem, such as the injector 236 or a NOx sensor, is operating below a predetermined threshold indicative of a malfunction, and/or provides other such performance information about the corresponding subsystem. It should be noted that the above subsystems are examples, and that the diagnostic input signals 602 may indicate status of any other component/subsystem of the vehicle 10.

In one or more examples, the control module 238 includes one or more adapters 605 that receive the input signals 602. For example, the control module 238 may include as many adapter modules 605 as the number of diagnostic input signals 602 that the control module 238 receives. Alternatively, the control module 238 includes a single adapter module 605 that receives the multiple diagnostic input signals 602. The adapter module(s) 605 generate one or more diagnostic factors 607 corresponding to each of the diagnostic input signals 602.

For example, the adapter module 605 may generate the diagnostic factors 607 based on a moving average, such as an exponential moving average (EMA), or an exponentially weighted moving average (EWMA) so as to continuously decrease the storage level S as a fault level of a subsystem indicated by the input signals 602 increases. For example, a first adaptation module 605A that receives an input signal 602A compares the received input with predetermined thresholds indicating a WPA (worst performing acceptable) threshold and a BPU (best performing unacceptable) threshold, respectively. Based on the comparison results with the thresholds, the adapter module 605A determines the diagnostic factor 607A. In one or more examples, the adapter module 605A includes a look-up table that is used to provide the diagnostic factor 607A. For example, table 1 illustrates an example look-up table that includes diagnostic adaptation factors corresponding to different EWMA values for the input signal 602A.

TABLE 1

| | EWMA result (%) | | | | | | | | |
|---|---|---|---|---|---|---|---|---|---|
| | −25 | −30 | −35 | −40 | −45 | −50 | −55 | −60 | −65 |
| Diagnostic Factor | 1 | 1.1 | 1.2 | 1.3 | 1.4 | 1.5 | 1.6 | 1.7 | 1.8 |

Alternatively, or in addition, the adapter module 605 may generate the diagnostic factors 607 based on differences between model-based predicted values and sensor-based observed values. For example, table 2 illustrates different values for the diagnostic factor 607A that may be based on differences between a predicted NOx value in the exhaust gas 216 and observed NOx value according to the NOx sensors 240.

TABLE 2

| | Difference between NOx model and NOx sensor (%) | | | | | | | | | | |
|---|---|---|---|---|---|---|---|---|---|---|---|
| | 0 | 10 | 20 | 30 | 40 | 50 | 60 | 70 | 80 | 90 | 100 |
| Diagnostic Factor | 1 | 1.05 | 1.1 | 1.15 | 1.2 | 1.25 | 1.3 | 1.35 | 1.4 | 1.45 | 1.5 |

For example, if the diagnostic signal 602A indicates the difference between the NOx model and the NOx sensor value, the adapter module 605A determines the diagnostic factor 607A according to a look-up table, such as table 2. Alternatively, or in addition, the adapter module 605A determines the diagnostic factor 607A by dynamically computing the adaptation factor 607A as a function of the diagnostic signal 602A. It should be noted that in other examples, the adapter module 605A may similarly determine the diagnostic factor 607A for any other diagnostic module 602A using a corresponding reference model, and that the NOx sensor diagnostics described herein is just one example.

The control module 238 may further include an aggregator module 610 that computes a correction factor 612. In one or more examples, the aggregator module 610 in conjunction with the comparator 620 determines the maximum value (if >1) or minimum value (if <1) of all diagnostic factors 607 and the LTA factor 609 and use that max/min value as the storage set-point S or reductant injector energizing time scaling factor. For example, the aggregator module 610 computes the correction factor 612 based on the diagnostic factors 607. In one or more examples, the diagnostic adaptation factors 607 are normalized to a predetermined range, such as [0, 1] by the corresponding adapter modules 605.

In one or more examples, if all of the diagnostic factors 607 have a value greater than or equal to 1 (or the maximum of the predetermined normalization range), the comparator 620 triggers the max-module 634 to determine the maximum value from among the diagnostic factors 607 and the LTA 609. If all of the diagnostic factors 607 have a value lesser than 1 (or the maximum of the predetermined normalization range), the comparator 620 triggers the min-module 632 to compute the minimum value from among the diagnostic factors 607 and the LTA 609. The maximum/minimum value that is output is used as the diagnostic adaptation factor.

Alternatively, in one or more examples, if any one of the diagnostic factors 607 has a value greater than or is equal to 1 (or the maximum of the predetermined normalization range), the comparator 620 triggers the max-module 634 to determine the maximum value from among the diagnostic factors 607 and the LTA 609. If any one of the diagnostic factors 607 has a value lesser than 1 (or the maximum of the predetermined normalization range), the comparator 620 triggers the min-module 632 to compute the minimum value from among the diagnostic factors 607 and the LTA 609. The maximum/minimum value that is output is used as the diagnostic adaptation factor.

The result from the max-module 634 or the min-module 632, is used as the diagnostic adaptation factor. In one or more examples, the diagnostic adaptation factor is used as a scaling factor for the injector energizing time or for the $NH_3$ storage set-point S. For example, the scaling factor may be used to calculate the set-point as $S_{new}$=scaling factor*$S_{model}$, where $S_{model}$ is the set-point according to the chemical model of the SCR Catalyst 220. Alternatively, or in addition, the scaling factor is used to instruct the injector 236 to inject the reductant 246 into the SCR Device 220 for $T_{new}$ seconds. For example, $T_{new}$=scaling factor*$T_{model}$, where $T_{model}$ is the injector energizing time according to the chemical model. Alternatively, in one or more examples, the diagnostic adaptation factor is used directly as the $NH_3$ storage set-point S or the injector energizing time.

In one or more examples, the LTA factor 609 is a predetermined value that is used by the control module 238 during the above determination of the correction factor. For example, the LTA factor 609 is a pre-configured value that is setup according to empirical values. The LTA factor 609 is updated dynamically to the scaling factor that is determined. For example, the LTA factor 609 may be initialized to the same value as the predetermined threshold used by the aggregator module 610. The LTA factor 609 may be updated after each iteration to be set to the scaling factor that is determined. The LTA factor 609 is used as one of the values to determine the maximum and minimum value by the max-module 634 and the min-module 632, respectively.

It should be noted that although the examples above use look-up tables to determine the diagnostic factors 607, in one or more examples the factors 607 may be computed dynamically based on the input signals 602, in real-time or near real-time.

Figure 7:
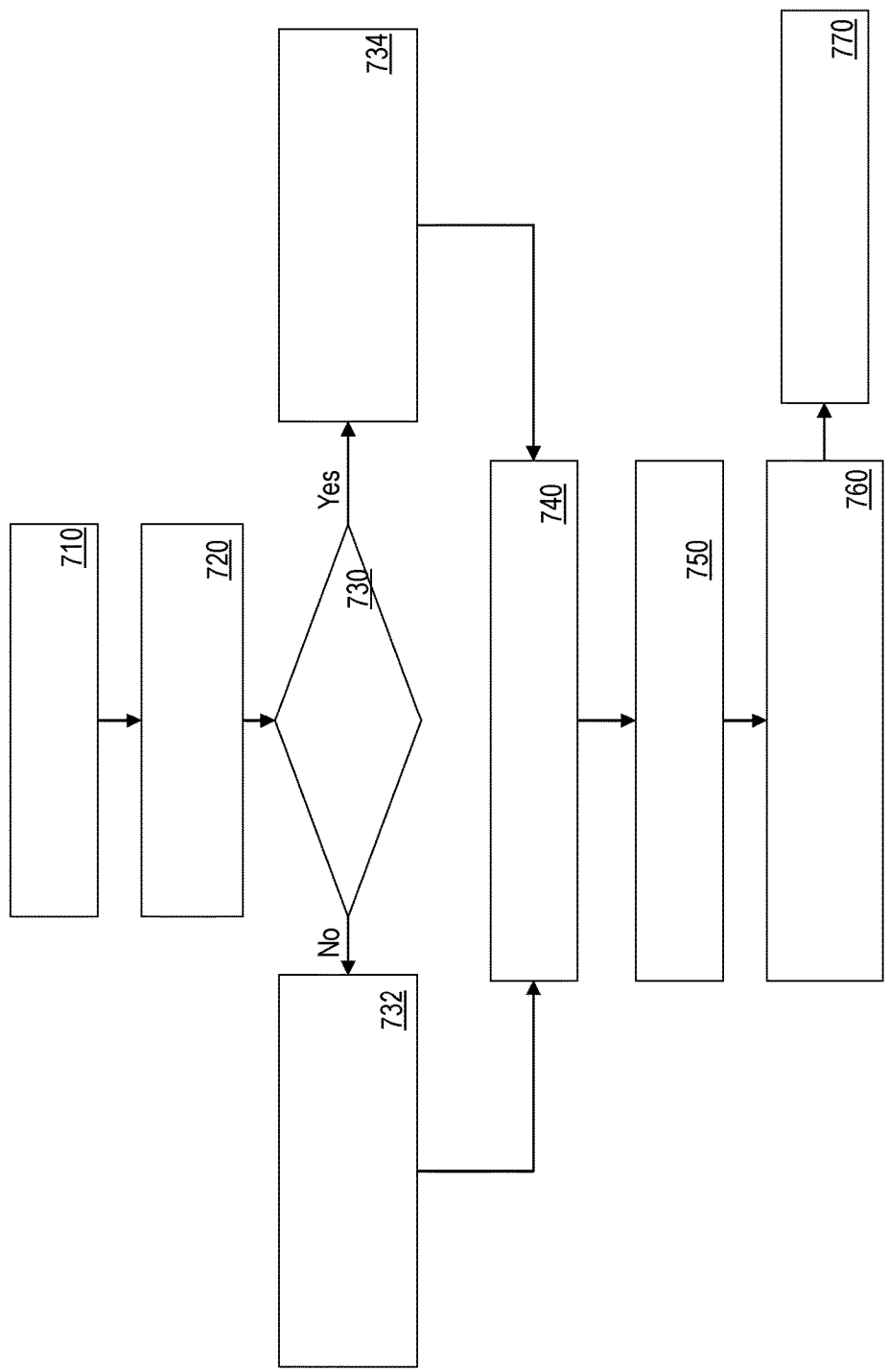
FIG. 7 illustrates a flowchart of an example method for controlling an amount of reductant injected into an SCR device, according to one or more embodiments.

FIG. 7 illustrates a flowchart of an example method for controlling an amount of reductant injected into the SCR Device 220, according to one or more embodiments. The method may be implemented by the control module 238 and/or any other processing unit in the emissions control system 34. The method includes receiving the diagnostic input signal 602A by the control module 238, as shown at 710. The diagnostic input signal 602A may be received from a diagnostic module that checks the operation of a subsystem, such as the reductant injector 236, a NOx sensor, or any other subsystem of the vehicle 10. The diagnostic input signal 602A may indicate performance information and/or malfunctioning of the subsystem being monitored by the diagnostic module.

The control module 238 further determines the correction factor 612 based on the diagnostic input signal 602A, as shown at 720. For example, determining the correction factor 612 includes determining a diagnostic factor 607A based on the diagnostic input signal 602A. For example, the control module 238A may use a look-up table to determine the diagnostic factor 607A. Alternatively, or in addition, the control module 238 may determine the diagnostic factor 607A based on real-time computations. In one or more examples, the correction factor 612 is further computed based on the diagnostic factor 607A. For example, the diagnostic input signal includes a plurality of signals. The diagnostic signals may be received from an on-board diagnostic system, or multiple diagnostic modules of the vehicle. The correction factor 612 is computed as a function of the multiple diagnostic signals received. In one or more examples, the correction factor 612 indicates if all of the diagnostic factors 607 have a value greater than or equal to 1, or not, where 1 is a maximum value of a range to which the diagnostic factors 607 are normalized. Alternatively, in one or more examples, the correction factor 612 indicates if any one of the diagnostic factors 607 has a value greater than or equal to 1, or not, where 1 is a maximum value of a range to which the diagnostic factors 607 are normalized. For example, the correction factor 612 may be a binary value (0, 1).

The control module 238 further compares the correction factor 612 with the predetermined threshold (T), such as 1, as shown at 730. If the correction factor 612 is greater than or equal to the predetermined threshold, the control module 238 determines the diagnostic adaptation factor as a maximum of the diagnostic factors 607 and the LTA factor 609, as shown at 734. If the correction factor 612 is not greater than the predetermined threshold, the control module 238 determines the diagnostic adaptation factor as a minimum of the diagnostic factors 607 and the LTA factor 609, as shown at 732. In one or more examples, the LTA factor 609 is a predetermined value.

Further, the control module 238 determines the injector energizing time according to the chemical model of the SCR 220, as shown at 740. The control module 238 adjusts the injector energizing time using the diagnostic adaptation factor, as shown at 750. For example, the control module 238 adjusts the injector energizing time using the diagnostic adaptation factor, for example by scaling it as described herein. Alternatively, the diagnostic adaptation factor is used as the injector energizing time directly. The control module 238 further uses the injector energizing time to determine the amount of reductant to inject into the SCR 220, as shown at 760. Accordingly, the control module 238 commands the injector module 236 to inject the determined amount of reductant 246. Further yet, in one or more examples, the control module 238 sets the diagnostic adaptation factor as the LTA factor 609 for the next iteration, as shown at 770. Alternatively, in one or more examples, the control module 238 sets the LTA factor 609 to the predetermined value.

Figure 8:
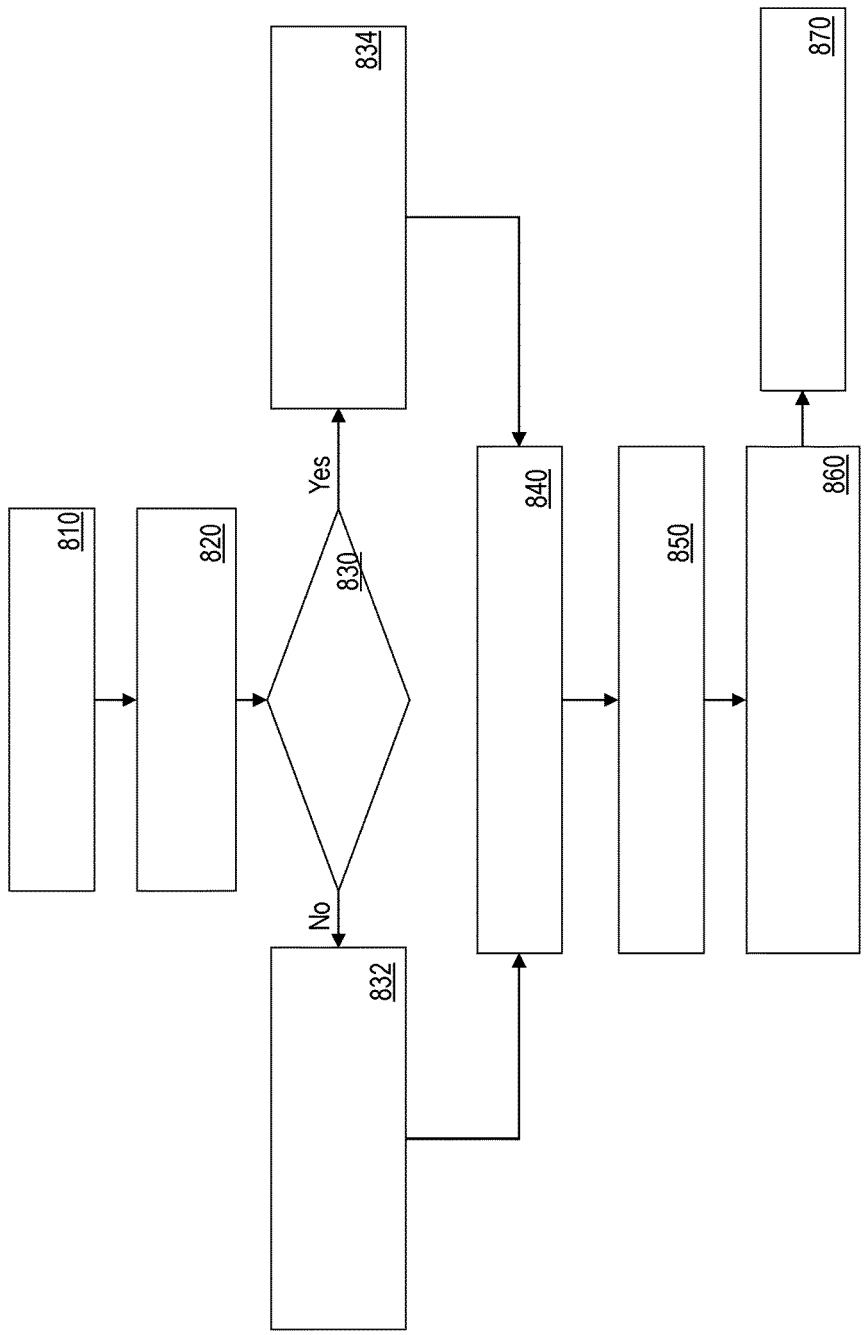
FIG. 8 illustrates a flowchart of an example method for controlling an amount of reductant injected into an SCR device, according to one or more embodiments.

FIG. 8 illustrates a flowchart of an example method for controlling an amount of reductant injected into the SCR Device 220, according to one or more embodiments. The method may be implemented by the control module 238 and/or any other processing unit in the emissions control system 34. The method includes receiving the diagnostic input signal 602A by the control module 238, as shown at 810. The diagnostic input signal 602A may be received from a diagnostic module that checks the operation of a subsystem, such as the reductant injector 236, a NOx sensor, or any other subsystem of the vehicle 10. The diagnostic input signal 602A may indicate performance information and/or malfunctioning of the subsystem being monitored by the diagnostic module.

The control module 238 further determines the correction factor 612 based on the diagnostic input signal 602A, as shown at 820. For example, determining the correction factor 612 includes determining a diagnostic factor 607A based on the diagnostic input signal 602A. For example, the control module 238A may use a look-up table to determine the diagnostic factor 607A. Alternatively, or in addition, the control module 238 may determine the diagnostic factor 607A based on real-time computations. In one or more examples, the correction factor 612 is further computed based on the diagnostic factor 607A. For example, the diagnostic input signal includes a plurality of signals. The diagnostic signals may be received from an on-board diagnostic system, or multiple diagnostic modules of the vehicle. The correction factor 612 is computed as a function of the multiple diagnostic signals received. In one or more examples, the correction factor 612 indicates if all of the diagnostic factors 607 have a value greater than or equal to 1, or not, where 1 is a maximum value of a range to which the diagnostic factors 607 are normalized. Alternatively, in one or more examples, the correction factor 612 indicates if any one of the diagnostic factors 607 has a value greater than or equal to 1, or not, where 1 is a maximum value of a range to which the diagnostic factors 607 are normalized. For example, the correction factor 612 may be a binary value (0, 1).

The control module 238 further compares the correction factor 612 with the predetermined threshold (T), such as 1, as shown at 830. If the correction factor 612 is greater than or equal to the predetermined threshold, the control module 238 determines the diagnostic adaptation factor as a maximum of the diagnostic factors 607 and the LTA factor 609, as shown at 834. If the correction factor 612 is not greater than the predetermined threshold, the control module 238 determines the diagnostic adaptation factor as a minimum of the diagnostic factors 607 and the LTA factor 609, as shown at 832. In one or more examples, the LTA factor 609 is a predetermined value.

Further, the control module 238 determines the $NH_3$ set-point S according to the chemical model of the SCR 220, as shown at 840. The control module 238 adjusts the set-point S using the diagnostic adaptation factor, as shown at 850. For example, the control module 238 determines $S_{new}$ using the diagnostic adaptation factor, as described herein. Alternatively, the control module 238 uses the diagnostic adaptation factor as the $NH_3$ set point $S_{new}$. Thus, the control module 238 uses the $S_{new}$ to determine the amount of reductant to inject into the SCR 220, as shown at 860. Accordingly, the control module 238 commands the injector module 236 to inject the determined amount of reductant 246 based on the adjusted set-point. Further yet, in one or more examples, the control module 238 sets the diagnostic adaptation factor as the LTA factor 609 for the next iteration, as shown at 870. Alternatively, in one or more examples, the control module 238 sets the LTA factor 609 to the predetermined value.

The technical solutions described herein facilitate improvements to emissions control systems used in combustion engines, such as those used in vehicles. For example, the technical solutions improve a 4/2 sigma separation/robustness of monitors requiring dosing intervention to meet emissions threshold. Further, the technical solutions facilitate resolving diagnostic deficiencies that may be detected during operation of the combustion engine, by providing better emissions performance when a fault is active. The technical solutions also facilitate removal of dependence on prep cycle definition for determining the amount of reductant to inject, and further reducing dependence on adaptation under faulted conditions in order to meet emissions threshold. Thus, the technical solutions facilitate the emissions control systems to calibrate adaptation to be less sensitive to faulty operation of one or more subsystems in the vehicle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle including an internal combustion engine, the emissions control system comprising:
   a reductant injector device;
   a selective catalytic reduction (SCR) device; and
   a controller configured to:
      determine a reductant energizing time for the reductant injector device based on one or more operating conditions of the SCR device;
      compute a diagnostic adaptation factor for the reductant energizing time based on an on-board diagnostic signal;
      changing a target $NH_3$ storage level of the SCR device to the diagnostic adaptation factor; and
      input an amount of reductant into the SCR device by adjusting a reductant energizing time of the reductant injector device to cause the SCR device to store an amount of $NH_3$ substantially equal to the target $NH_3$ storage level;
   wherein computing the diagnostic adaptation factor comprises:
      determining a diagnostic factor based on the on-board diagnostic signal;
      comparing the diagnostic factor with a predetermined threshold; and
      in response to the diagnostic factor being greater than the predetermined threshold, computing the diagnostic adaptation factor as a maximum of the diagnostic factor and a predetermined long-term adaptation factor, and in response to the diagnostic factor not being greater than the predetermined threshold, computing the diagnostic adaptation factor as a minimum of the diagnostic factor and the predetermined long-term adaptation factor.

2. The emissions control system of claim 1, wherein the controller inputs the amount of reductant into the SCR device by instructing the reductant injector device.

3. The emissions control system of claim 1, wherein the diagnostic adaptation factor is further based on a difference between a predicted NOx value in exhaust gases and measured NOx value in the exhaust gas.

4. The emissions control system of claim 3, wherein the predicted NOx value is based on a chemical model of the SCR device.

5. The emissions control system of claim 1, wherein the on-board diagnostic signal comprises a plurality of diagnostic signals and the diagnostic adaptation factor is computed as a function of the plurality of diagnostic signals.

6. The emissions control system of claim 1, wherein the diagnostic adaptation factor is computed based on an exponentially weighted moving average of the on-board diagnostic signal.

7. The emissions control system of claim 1, wherein the controller is further configured to use the diagnostic adaptation factor as the predetermined long-term adaptation factor.

8. An exhaust system for treating exhaust gas emitted by an internal combustion engine, configured to perform a selective catalytic reduction (SCR) of exhaust gas, the exhaust system comprising:
a controller configured to:
compute a diagnostic adaptation factor for an SCR device of the exhaust system based on an on-board diagnostic signal; and
input an amount of a reductant into the SCR device by configuring the exhaust system according to the diagnostic adaptation factor, wherein configuring the exhaust system comprises using the diagnostic adaptation factor as a target $NH_3$ storage level of the SCR device;
wherein computing the diagnostic adaptation factor comprises:
determining a diagnostic factor based on the on-board diagnostic signal;
comparing the diagnostic factor with a predetermined threshold; and
in response to the diagnostic factor being greater than the predetermined threshold, computing the diagnostic adaptation factor as a maximum of the diagnostic factor and a predetermined long-term adaptation factor, and
in response to the diagnostic factor not being greater than the predetermined threshold, computing the diagnostic adaptation factor as a minimum of the diagnostic factor and the predetermined long-term adaptation factor.

9. The exhaust system of claim 8, wherein the diagnostic adaptation factor is based on a difference between a predicted NOx value in the exhaust gas and measured NOx value in the exhaust gas.

10. The exhaust system of claim 8, wherein configuring the exhaust system comprises scaling a reductant energizing time of a reductant injector of the exhaust system using the diagnostic adaptation factor.

11. The exhaust system of claim 8, wherein the diagnostic adaptation factor is computed based on an exponentially weighted moving average of the on-board diagnostic signal.

12. The exhaust system of claim 8, wherein the controller is further configured to set the diagnostic adaptation factor as the predetermined long-term adaptation factor.

13. A computer-implemented method for controlling a selective catalytic reduction (SCR) device of an exhaust system of an internal combustion engine, the method comprising:
computing a diagnostic adaptation factor for an SCR device of the exhaust system based on an on-board diagnostic signal; and
inputting an amount of reductant into the SCR device by configuring the exhaust system according to the diagnostic adaptation factor, wherein configuring the exhaust system comprises using the diagnostic adaptation factor as a $NH_3$ set-point of the SCR device;
wherein computing the diagnostic adaptation factor further comprises:
determining a diagnostic factor based on the on-board diagnostic signal;
comparing the diagnostic factor with a predetermined threshold; and
in response to the diagnostic factor being greater than the predetermined threshold, computing the diagnostic adaptation factor as a maximum of the diagnostic factor and a predetermined long-term adaptation factor, and
in response to the diagnostic factor not being greater than the predetermined threshold, computing the diagnostic adaptation factor as a minimum of the diagnostic factor and the predetermined long-term adaptation factor.

14. The method of claim 13, configuring the exhaust system comprises scaling a reductant energizing time of a reductant injector of the exhaust system using the diagnostic adaptation factor.

15. The method of claim 13, wherein the diagnostic adaptation factor is based on a difference between a predicted NOx value in exhaust gas in the exhaust system and measured NOx value in the exhaust gas, and the diagnostic adaptation factor is computed based on an exponentially weighted moving average of the on-board diagnostic signal.

* * * * *